United States Patent
Suzuki et al.

(10) Patent No.: US 8,147,068 B2
(45) Date of Patent: Apr. 3, 2012

(54) PROJECTION DISPLAY APPARATUS

(75) Inventors: Hiroaki Suzuki, Kanagawa (JP); Norihiro Ohse, Kanagawa (JP)

(73) Assignee: Sony Corporation (JP)

( * ) Notice: Subject to any disclaimer, the term of this patent is extended or adjusted under 35 U.S.C. 154(b) by 448 days.

(21) Appl. No.: 12/148,221

(22) Filed: Apr. 17, 2008

(65) Prior Publication Data

US 2008/0259286 A1 Oct. 23, 2008

(30) Foreign Application Priority Data

Apr. 20, 2007 (JP) ................ P2007-111792

(51) Int. Cl.
- G03B 21/00 (2006.01)
- G02B 13/20 (2006.01)

(52) U.S. Cl. ........................... 353/31; 359/707
(58) Field of Classification Search ............ 353/98, 353/99, 94, 20, 31, 34, 37; 359/707, 558, 359/599; 349/5, 8, 9
See application file for complete search history.

(56) References Cited

U.S. PATENT DOCUMENTS

| | | | |
|---|---|---|---|
| 6,433,846 | B1 | 8/2002 | Omar et al. |
| 2003/0039036 | A1* | 2/2003 | Kruschwitz et al. ......... 359/707 |
| 2004/0070736 | A1* | 4/2004 | Roddy et al. ................ 353/31 |
| 2006/0227293 | A1* | 10/2006 | Kasazumi et al. ............. 353/30 |
| 2008/0192501 | A1* | 8/2008 | Bartlett et al. ............... 362/606 |

FOREIGN PATENT DOCUMENTS

| | | |
|---|---|---|
| JP | 09-090510 A | 4/1997 |
| JP | 9-318907 A | 12/1997 |
| JP | 10-039411 A | 2/1998 |
| JP | 2002501624 T | 1/2002 |
| JP | 2004-151177 A | 5/2004 |
| WO | 2005-008330 A1 | 1/2005 |
| WO | 2005-098532 A1 | 10/2005 |

OTHER PUBLICATIONS

Office Action from Japanese Application No. 2007-111792, dated Feb. 9, 2010.

* cited by examiner

*Primary Examiner* — William C Dowling
*Assistant Examiner* — Ryan Howard
(74) *Attorney, Agent, or Firm* — Lerner, David, Littenberg, Krumholz & Mentlik, LLP

(57) ABSTRACT

A projection display apparatus includes a light source, a plurality of light modulating elements that respectively modulate different color components of light emitted from the light source, a plurality of light diffusing elements that are disposed on sides near the light source with reference to the respective light modulating elements, a light integrating element that integrates the different color components modulated by the light modulating elements, and a projection optical element that projects light resulting from the different color components integrated by the light integrating element.

3 Claims, 7 Drawing Sheets

LIGHT INCIDENT ANGLE ON BONDING PART

PROJECTION DISPLAY APPARATUS

CROSS-REFERENCES TO RELATED APPLICATIONS

The present application claims priority from Japanese Patent Application No. JP 2007-111792, filed in the Japanese Patent Office on Apr. 20, 2007, the entire content of which is incorporated herein by reference.

BACKGROUND OF THE INVENTION

1. Field of the Invention

The present invention relates to projection display apparatuses such as three-liquid-crystal-display projector apparatuses.

2. Description of the Related Art

In recent years, projection display apparatuses have been commercialized in which white light emitted from a light source is separated into components of three colors of red (R), green (G), and blue (B), which are modulated by corresponding light modulating elements and are subsequently integrated together, whereby an image is projected on a screen.

Examples of such projection display apparatuses include those having a discharge lamp as a light source and those having transmissive liquid crystal display devices or digital micromirror devices (DMDs) as light modulating elements. Various improvements have been made to such devices and optical systems. Particularly, projection display apparatuses including higher-resolution reflective liquid crystal display devices have also been commercialized.

A typical projection display apparatus operates as follows: White light emitted from a light source is separated into components of three colors of R, G, and B by dichroic mirrors. Then, the separated components are modulated by corresponding light modulating elements. Subsequently, the components are integrated together by a cross-dichroic prism or the like. Lastly, the integrated light is enlarged and projected onto a screen by a projection lens.

Referring to FIG. 5, a cross-dichroic prism 70 includes four triangular prisms 71, 72, 73, and 74 each having two surfaces thereof covered with an optical thin film so as to obtain a desired reflection characteristic. The prisms 71 to 74 are bonded together with the film-covered surfaces thereof facing each other, thereby forming a rectangular parallelepiped body.

Japanese Unexamined Patent Application Publication No. 9-90510 discloses a projection display apparatus including liquid crystal display devices in which the occurrence of shade on a screen is suppressed by arranging convex lenses provided in optical means (multi-lens arrays) in a staggered manner.

SUMMARY OF THE INVENTION

In the cross-dichroic prism 70, however, the following problems may occur at a prism bonding part 75, which is a part common to the four prisms 71 to 74 (the normal in the center of the prism 70): Firstly, the prisms 71 to 74 are not necessarily uniformly bonded together with an adhesive, which is typically an ultraviolet-hardening resin. Secondly, there may be a gap between bonding surfaces because of profile irregularity of the prisms 71 to 74. Thirdly, if the films provided on the prisms 71 to 74 are not evenly formed, the prism bonding part 75 may have a discontinuous reflection characteristic. Fourthly, edges of the prisms 71 to 74 near the prism bonding part 75 may be cracked or chipped.

In case of such problems, referring to FIG. 6 for example, a portion of light that enters the cross-dichroic prism 70 after sequentially passing through a fly-eye lens 76, a condenser lens 77, a field lens 78, and a liquid crystal display device 79 may be scattered when passing through the prism bonding part 75. The scattered light appears as shade in an image projected on the screen.

If a fly-eye lens or a rod integrator is used in an illumination optical system, the light passing through the prism bonding part 75 shows a periodic intensity distribution as shown in FIG. 7. Consequently, periodic shade (unevenness of an image displayed) as shown in FIG. 8 may appear in an image displayed on the screen. If a coherent light source that can be almost referred to as a point source, such as a laser emission device, is used, the periodic shade may become more distinct on the screen because of the intense directivity of the light source. In such a case, it is difficult to obtain a good image.

It is desirable to provide a projection display apparatus capable of suppressing the occurrence of shade on a screen caused by scattering of light integrated by a light integrating element.

A projection display apparatus according to an embodiment of the present invention includes a light source, a plurality of light modulating elements that respectively modulate different color components of light emitted from the light source, a plurality of light diffusing elements that are disposed on sides near the light source with reference to the respective light modulating elements, a light integrating element that integrates the different color components modulated by the light modulating elements, and a projection optical element that projects light resulting from the different color components integrated by the light integrating element.

In the projection display apparatus according to the embodiment, light is diffused by the light diffusing elements disposed on sides near the light source with respect to the corresponding light modulating elements that modulate the light of the respective color components. In this manner, the shade to be projected on the screen because of scattering of the light integrated by the light integrating element becomes less visible.

With the projection display apparatus according to the embodiment, the occurrence of shade on a screen caused by scattering of light integrated by the light integrating element can be suppressed. Thus, image quality can be improved.

DESCRIPTION OF THE PREFERRED EMBODIMENTS

Embodiments of the present invention will now be described in detail with reference to the drawings.

First Embodiment

Figure 1:
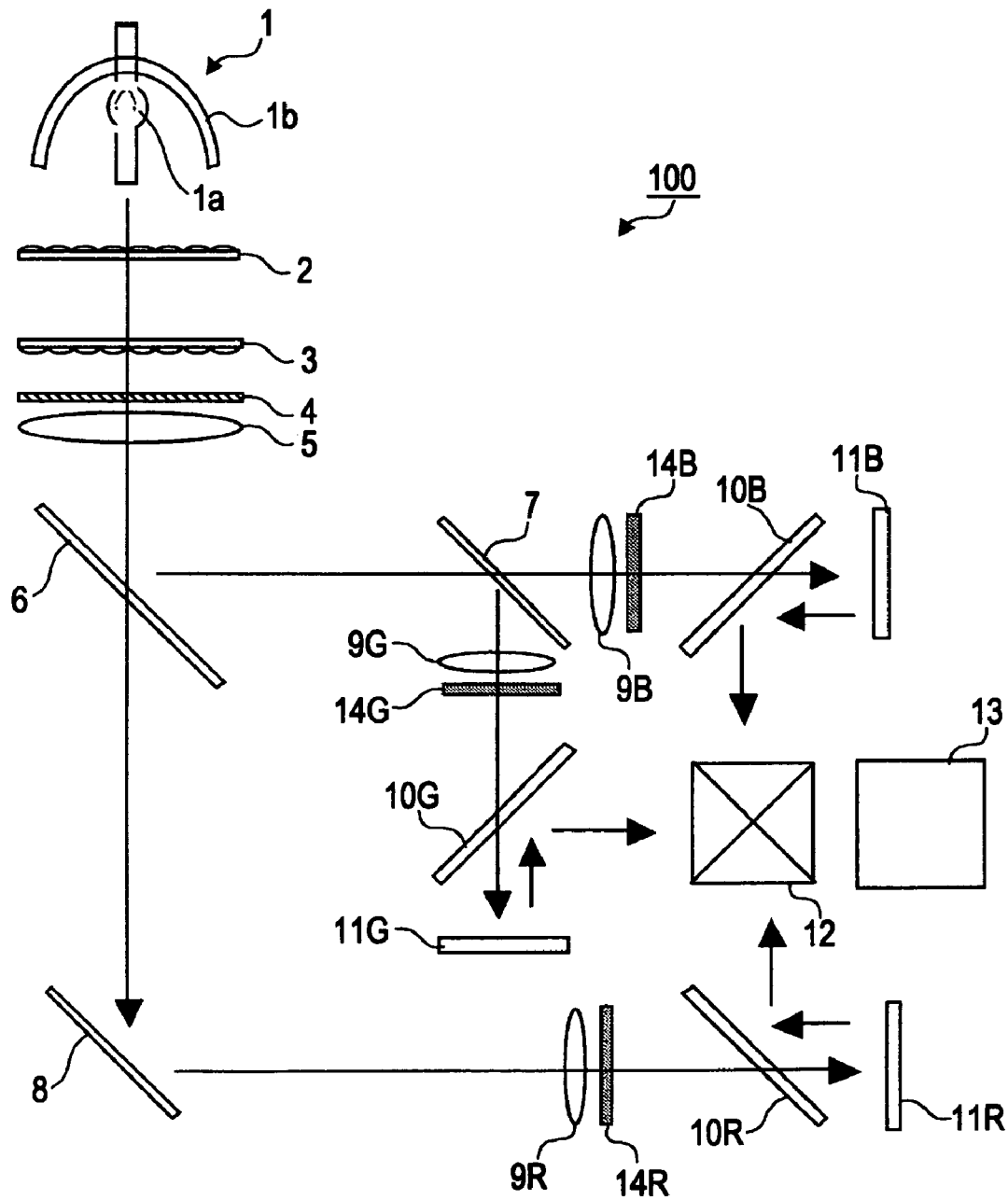
FIG. 1 is a schematic diagram of a projection display apparatus according to a first embodiment of the present invention.

FIG. 1 is a schematic diagram of an exemplary projection display apparatus according to a first embodiment of the invention. A projection display apparatus 100 includes a lamp 1 as a light source, two integrator lenses (fly-eye lenses) 2 and 3, a polarization beam splitter 4, a condenser lens 5 as a light condensing element, two dichroic mirrors 6 and 7 as light separating elements, a reflecting mirror 8, three field lenses 9R, 9G, and 9B, three reflective polarizers 10R, 10G, and 10B as polarizing elements, three reflective liquid crystal display devices 11R, 11G, and 11B as light modulating elements, a light integrating prism 12 as a light integrating element, a projection lens 13 as a projection optical element, and three light diffusing plates 14R, 14G, and 14B as light diffusing elements.

The lamp 1, which emits white light, is an ultra-high-pressure mercury lamp, for example, and includes a light emitting unit 1a and a reflector 1b. The light emitting unit 1a of the lamp 1 is disposed at the focal position of the reflector 1b. The light emitted from the light emitting unit 1a of the lamp 1 is reflected by the reflector 1b, thereby being emitted as almost parallel light.

The integrator lenses 2 and 3 are provided for equalizing the illuminances of the light to be incident on the reflective liquid crystal display devices 11R, 11G, and 11B. The polarization beam splitter 4 polarizes the light incident thereon through the integrator lenses 2 and 3 in a predetermined direction. The condenser lens 5 condenses the light incident thereon through the polarization beam splitter 4.

The dichroic mirror 6 transmits a red light component (red spectrum band) of the light incident thereon through the condenser lens 5, and reflects green and blue light components (green and blue spectrum bands) at 90 degrees. The dichroic mirror 7 transmits the blue light component reflected by the dichroic mirror 6, and reflects at 90 degrees the green light component also reflected by the dichroic mirror 6. The reflecting mirror 8 reflects at 90 degrees the red light component that has passed through the dichroic mirror 6.

The field lens 9R transmits the red light component reflected by the reflecting mirror 8. The field lens 9G transmits the green light component reflected by the dichroic mirror 7. The field lens 9B transmits the blue light component that has passed through the dichroic mirror 7.

The reflective polarizer 10R transmits the light incident thereon through the field lens 9R while reflecting at 90 degrees the light incident thereon from the reflective liquid crystal display device 11R. The reflective polarizer 10G transmits the light incident thereon through the field lens 9G while reflecting at 90 degrees the light incident thereon from the reflective liquid crystal display device 11G. The reflective polarizer 10B transmits the light incident thereon through the field lens 9B while reflecting at 90 degrees the light incident thereon from the reflective liquid crystal display device 11B.

The reflective liquid crystal display device 11R modulates the red light component incident thereon through the reflective polarizer 10R. The reflective liquid crystal display device 11G modulates the green light component incident thereon through the reflective polarizer 10G. The reflective liquid crystal display device 11B modulates the blue light component incident thereon through the reflective polarizer 10B.

The light integrating prism 12 integrates the light components of the three colors (R, G, and B) respectively incident thereon from the reflective polarizers 10R, 10G, and 10B. The light integrating prism 12 is a cross-dichroic prism. The projection lens 13 enlarges and projects the light (an image) integrated by the light integrating prism 12 on a screen (not shown).

The light diffusing plate 14R diffuses and transmits the red light component incident thereon from the lamp 1 through the field lens 9R. The light diffusing plate 14R is disposed on one of optical paths running from the lamp 1, which is the most upstream end, to the projection lens 13, which is the most downstream end. With respect to the reflective liquid crystal display device 11R, the light diffusing plate 14R resides on a side near the light source and between the reflective polarizer 10R and the field lens 9R, which is the lens residing nearest to the reflective liquid crystal display device 11R. More specifically, the light diffusing plate 14R faces the light outputting surface of the field lens 9R.

The light diffusing plate 14G diffuses and transmits the green light component incident thereon from the lamp 1 through the field lens 9G. The light diffusing plate 14G is disposed on another one of the optical paths. With respect to the reflective liquid crystal display device 11G, the light diffusing plate 14G resides on a side near the light source and between the reflective polarizer 10G and the field lens 9G, which is the lens residing nearest to the reflective liquid crystal display device 11G. More specifically, the light diffusing plate 14G faces the light outputting surface of the field lens 9G.

The light diffusing plate 14B diffuses and transmits the blue light component incident thereon from the lamp 1 through the field lens 9B. The light diffusing plate 14B is disposed on the other one of the optical paths. With respect to the reflective liquid crystal display device 11B, the light diffusing plate 14B resides on a side near the light source and between the reflective polarizer 10B and the field lens 9B, which is the lens residing nearest to the reflective liquid crystal display device 11B. More specifically, the light diffusing plate 14B faces the light outputting surface of the field lens 9B.

In the projection display apparatus 100 having the configuration described above, white light emitted from the lamp 1 sequentially passes through the integrator lenses 2 and 3, the polarization beam splitter 4, and the condenser lens 5, and enters the dichroic mirror 6. At the dichroic mirror 6, the red light component is transmitted therethrough and the green and blue light components are reflected.

The red light component that has passed through the dichroic mirror 6 is reflected by the reflecting mirror 8, and sequentially passes through the field lens 9R, the light diffusing plate 14R, and the reflective polarizer 10R. The light that has passed through the reflective polarizer 10R enters the reflective liquid crystal display device 11R, by which the light is modulated in accordance with a video signal. The red light component modulated by the reflective liquid crystal display device 11R reenters the reflective polarizer 10R. Depending on the degree of modulation by the reflective liquid crystal display device 11R, a portion of the light passes through the reflective polarizer 10R to return toward the light source, and the other portion is reflected by the reflective polarizer 10R to enter the light integrating prism 12.

On the other hand, the light reflected by the dichroic mirror 6 enters the dichroic mirror 7, at which the blue light component is transmitted therethrough and the green light component is reflected. The green light component reflected by the dichroic mirror 7 sequentially passes through the field lens 9G, the light diffusing plate 14G, and the reflective polarizer 10G. Further, the light that has passed through the reflective polarizer 10G enters the reflective liquid crystal display device 11G to be modulated in accordance with the video signal. The green light component modulated by the reflective liquid crystal display device 11G reenters the reflective polarizer 10G. Depending on the degree of modulation by the reflective liquid crystal display device 11G, a portion of the light passes through the reflective polarizer 10G to return toward the light source, and the other portion is reflected by the reflective polarizer 10G to enter the light integrating prism 12.

The blue light component that has passed through the dichroic mirror 7 sequentially passes through the field lens 9B, the light diffusing plate 14B, and the reflective polarizer 10B. Further, the light that has passed through the reflective polarizer 10B enters the reflective liquid crystal display device 11B to be modulated in accordance with the video signal. The blue light component modulated by the reflective liquid crystal display device 11B reenters the reflective polarizer 10B. Depending on the degree of modulation by the reflective liquid crystal display device 11B, a portion of the light passes through the reflective polarizer 10B to return toward the light source, and the other portion is reflected by the reflective polarizer 10B to enter the light integrating prism 12.

The light integrating prism 12 transmits the green light component and reflects the red and blue light components at 90 degrees. Accordingly, the light components of the three colors that have entered the light integrating prism 12 are integrated together to be emitted in the same direction. The light integrated as such enters the projection lens 13, by which a video (image) based on the light that has entered therein from the light integrating prism 12 is enlarged at a predetermined magnification and projected on a screen.

In the projection display apparatus 100 configured to operate as described above, the red light component traveling toward the light integrating prism 12 is diffused when passing through the light diffusing plate 14R provided on a side near the light source with respect to the reflective liquid crystal display device 11R. Likewise, the green light component traveling toward the light integrating prism 12 is diffused when passing through the light diffusing plate 14G provided on a side near the light source with respect to the reflective liquid crystal display device 11G, and the blue light component traveling toward the light integrating prism 12 is diffused when passing through the light diffusing plate 14B provided on a side near the light source with respect to the reflective liquid crystal display device 11B.

In this manner, the shade to be projected on the screen because of the red light component passing through the bonding part of the light integrating prism 12 becomes lighter as a result of light diffusion occurring at the light diffusing plate 14R. Likewise, the shade to be projected on the screen because of the green light component passing through the bonding part of the light integrating prism 12 becomes lighter as a result of light diffusion occurring at the light diffusing plate 14G, and the shade to be projected on the screen because of the blue light component passing through the bonding part of the light integrating prism 12 becomes lighter as a result of light diffusion occurring at the light diffusing plate 14B.

Figure 2:
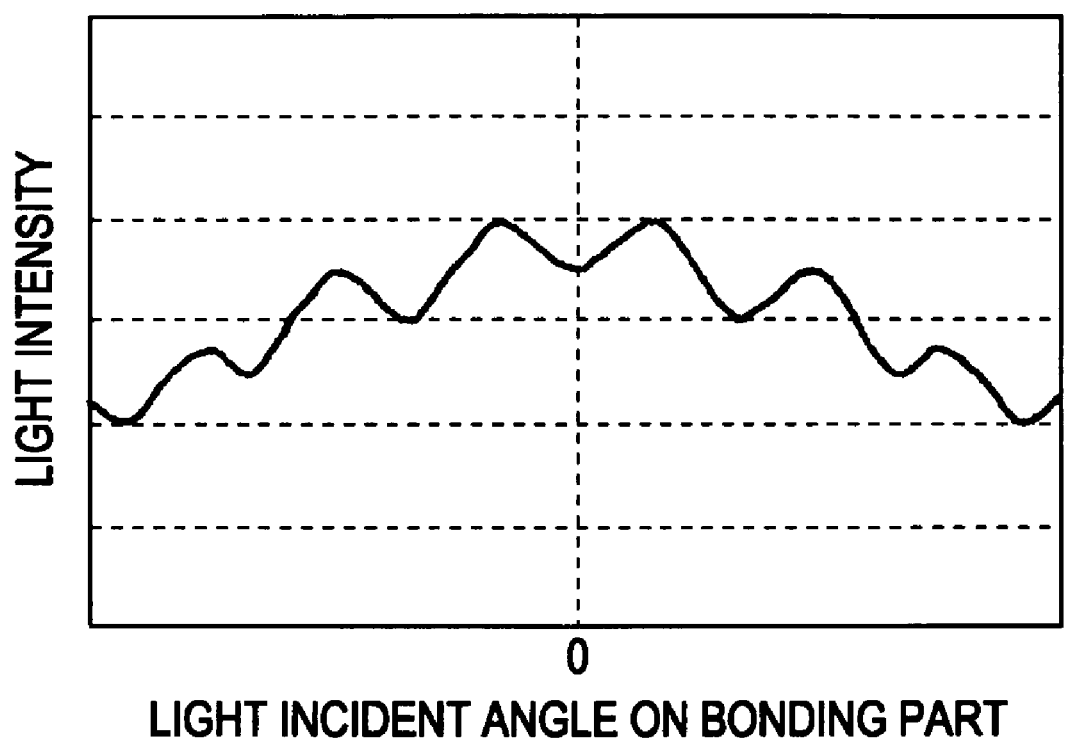
FIG. 2 is a graph showing the relationship between the intensity and the incident angle of light in a projection display apparatus with light diffusing elements.
Figure 7:
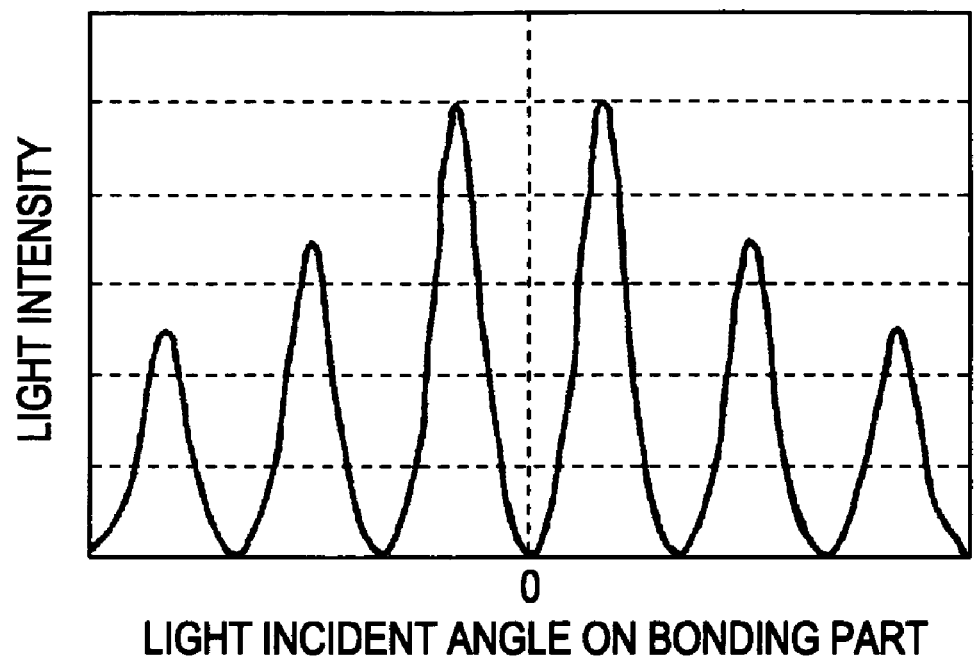
FIG. 7 is a graph showing the relationship between the intensity and the incident angle of light in a projection display apparatus without light diffusing elements.
Figure 8:
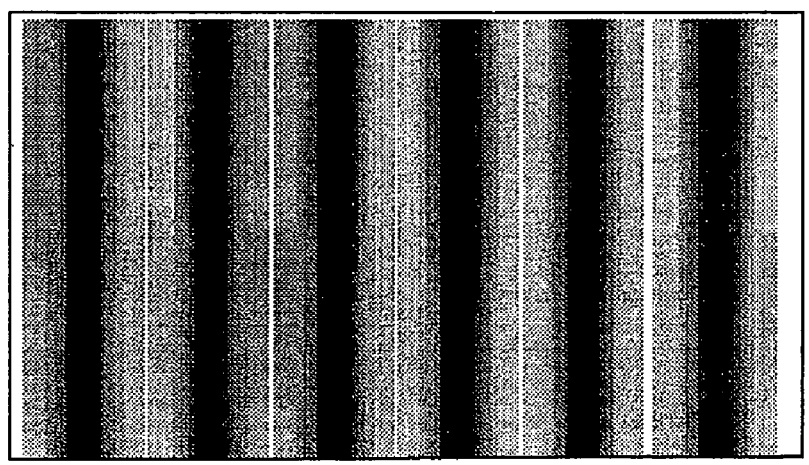
FIG. 8 shows shade projected on a screen.

The relationship between the incident angle (the angle of normal incidence is specified as 0 degrees) and the intensity of light incident on the bonding part of the light integrating prism 12 will be considered. Referring to FIGS. 7 and 8 showing the case where the light diffusing plates 14R, 14G, and 14B are not provided, the curve showing the intensity distribution is very steep because of scattering of light occurring at the prism bonding part, thereby producing periodic peaks. Consequently, distinct shade appears on the screen. Referring to FIG. 2, however, showing the case where the light diffusing plates 14R, 14G, and 14B are provided, the curve showing the intensity distribution is gentle. Consequently, shade becomes less recognizable.

Thus, even if a portion of the light components of the three colors is scattered when passing through the bonding part of the light integrating prism 12, the scattered light is evenly spread on the screen. This lightens the periodic shade to be projected on the screen. Consequently, the shade to be projected on the screen because of the light scattering at the prism bonding part becomes less visible. Accordingly, image quality is improved.

In general, use of a light diffusing element in such an illumination optical system as described above may cause some loss in the quantity of light and consequently a reduction in the quantity of light to be supplied to the light modulating elements. In view of such circumstances, a light diffusing element desirably has a characteristic that the light diffusing angle is as small as possible only if it can change the relationship between the incident angle and the intensity of light incident on the prism bonding part from that shown in FIG. 7 to that shown in FIG. 2. That is, the haze of the light diffusing element is desired to be sufficiently small. The diffusion angle of the light diffusing element is represented by the full width at half maximum of the curve showing the diffusion distribution with respect to the normal incidence onto the light diffusing element.

It is difficult to generalize the relationship between the diffusion angle, or the haze, and the loss in the quantity of light in the light diffusing element because the relationship varies with factors such as the f-number of the illumination optical system, the dimensions of the liquid crystal display devices, the distribution of the light emitted from the light source. Under such circumstances, an evaluation of the loss in the quantity of light, unevenness of an image displayed on the screen, and the like was performed using optical systems (including liquid crystal display devices whose panel sizes range from about 0.6 to 0.8 inches) that are commonly used at present and having f-numbers from about 2.0 to about 3.2. The evaluation showed that a desirable diffusion angle was 3 degrees or larger but 8 degrees or smaller. For example, at a diffusion angle of 5 degrees, the loss in the quantity of light was about 2, and both the unevenness of an image displayed on the screen and the decrease in brightness around the screen were permissible.

Second Embodiment

Figure 3:
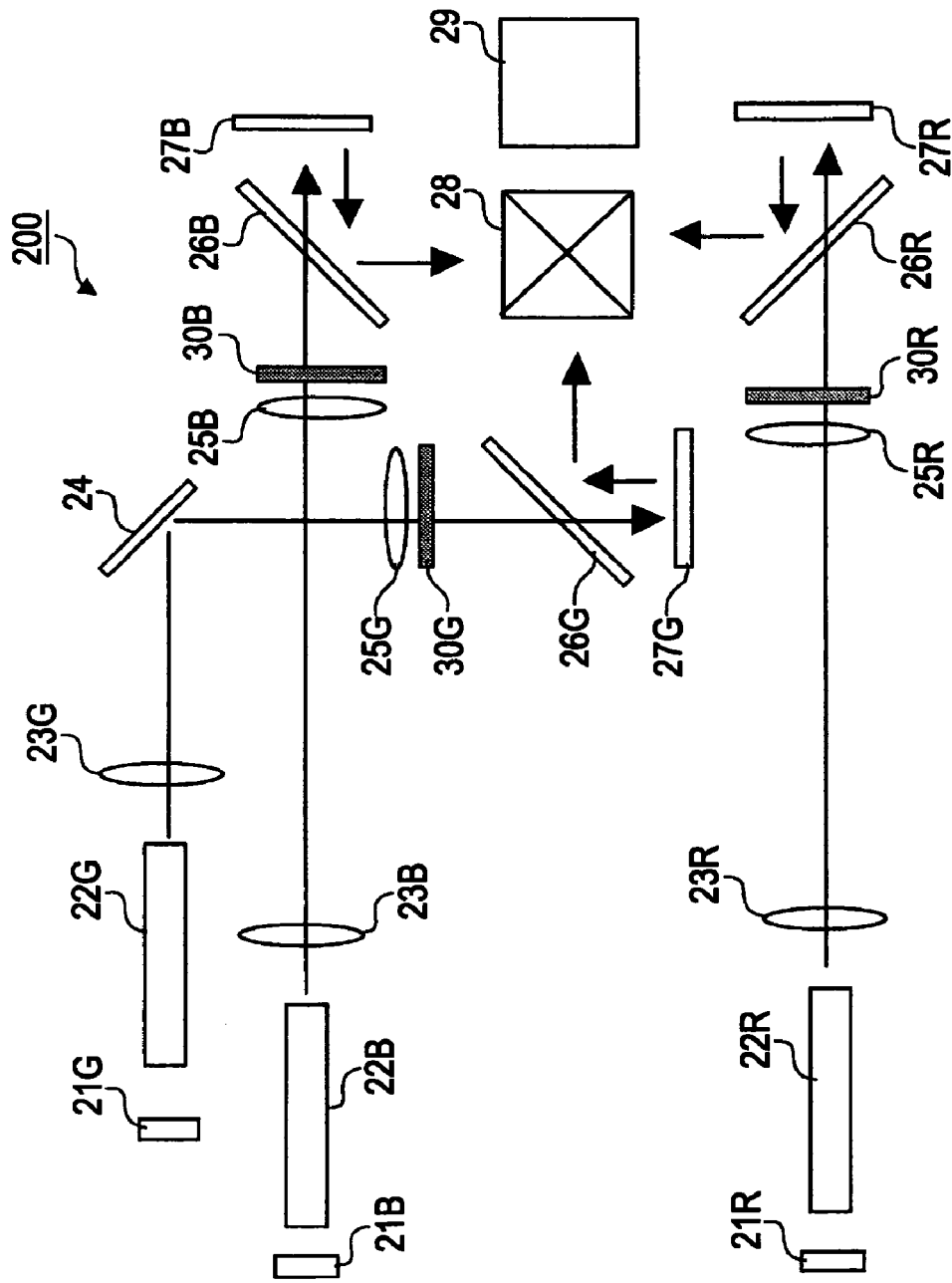
FIG. 3 is a schematic diagram of a projection display apparatus according to a second embodiment of the present invention.

FIG. 3 is a schematic diagram of an exemplary projection display apparatus according to a second embodiment of the invention. A projection display apparatus 200 includes three laser emitting elements 21R, 21G, and 21B as light sources, three rod integrators 22R, 22G, and 22B, three condenser lenses 23R, 23G, and 23B as light condensing elements, a reflecting mirror 24, three field lenses 25R, 25G, and 25B, and three reflective polarizers 26R, 26G, and 26B as polarizing elements, three reflective liquid crystal display devices 27R, 27G, and 27B as light modulating elements, a light integrating prism 28 as a light integrating element, a projection lens 29 as a projection optical element, and three light diffusing plates 30R, 30G, and 30B as light diffusing elements.

The laser emitting element 21R emits a laser beam of a red light component. The laser emitting element 21G emits a laser beam of a green light component. The laser emitting element 21B emits a laser beam of a blue light component.

The rod integrators 22R, 22G, and 22B are provided for equalizing the illuminances of the light to be incident on the reflective liquid crystal display devices 27R, 27G, and 27B.

The condenser lens 23R condenses the light incident thereon through the rod integrator 22R. The condenser lens 23G condenses the light incident thereon through the rod integrator 22G. The condenser lens 23B condenses the light incident thereon through the rod integrator 22B.

The reflecting mirror 24 reflects at 90 degrees the green light component incident thereon through the condenser lens 23G. The field lens 25R transmits the red light component incident thereon through the condenser lens 23R. The field lens 25G transmits the green light component reflected by the reflecting mirror 24. The field lens 25B transmits the blue light component incident thereon through the condenser lens 23B.

The reflective polarizer 26R transmits the light incident thereon through the field lens 25R while reflecting at 90 degrees the light incident thereon from the reflective liquid crystal display device 27R. The reflective polarizer 26G transmits the light incident thereon through the field lens 25G while reflecting at 90 degrees the light incident thereon from the reflective liquid crystal display device 27G. The reflective polarizer 26B transmits the light incident thereon through the field lens 25B while reflecting at 90 degrees the light incident thereon from the reflective liquid crystal display device 27B.

The reflective liquid crystal display device 27R modulates the red light component incident thereon through the reflective polarizer 26R. The reflective liquid crystal display device 27G modulates the green light component incident thereon through the reflective polarizer 26G. The reflective liquid crystal display device 27B modulates the blue light component incident thereon through the reflective polarizer 26B.

The light integrating prism 28 integrates the light components of the three colors (R, G, and B) respectively incident thereon from the reflective polarizers 26R, 26G, and 26B. The light integrating prism 28 is a cross-dichroic prism. The projection lens 29 enlarges and projects the light (an image) integrated by the light integrating prism 28 on a screen (not shown).

The light diffusing plate 30R diffuses and transmits the red light component incident thereon from the laser emitting element 21R through the field lens 25R. The light diffusing plate 30R is disposed on an optical path running from the laser emitting element 21R, which is the most upstream end, to the projection lens 29, which is the most downstream end. With respect to the reflective liquid crystal display device 27R, the light diffusing plate 30R resides on a side near the light source and between the reflective polarizer 26R and the field lens 25R, which is the lens residing nearest to the reflective liquid crystal display device 27R. More specifically, the light diffusing plate 30R faces the light outputting surface of the field lens 25R.

The light diffusing plate 30G is disposed on an optical path running from the laser emitting element 21G, which is the most upstream end, to the projection lens 29, which is the most downstream end. With respect to the reflective liquid crystal display device 27G, the light diffusing plate 30G resides on a side near the light source and between the reflective polarizer 26G and the field lens 25G, which is the lens residing nearest to the reflective liquid crystal display device 27G. More specifically, the light diffusing plate 30G faces the light outputting surface of the field lens 25G.

The light diffusing plate 30B is disposed on an optical path running from the laser emitting element 21B, which is the most upstream end, to the projection lens 29, which is the most downstream end. With respect to the reflective liquid crystal display device 27B, the light diffusing plate 30B resides on a side near the light source and between the reflective polarizer 26B and the field lens 25B, which is the lens residing nearest to the reflective liquid crystal display device 27B. More specifically, the light diffusing plate 30B faces the light outputting surface of the field lens 25B.

In the projection display apparatus 200 having the configuration described above, the laser beam of the red light component emitted from the laser emitting element 21R sequentially passes through the rod integrator 22R, the condenser lens 23R, the field lens 25R, the light diffusing plate 30R, and the reflective polarizer 26R. The light that has passed through the reflective polarizer 26R enters the reflective liquid crystal display device 27R, by which the light is modulated in accordance with a video signal. The red light component modulated by the reflective liquid crystal display device 27R reenters the reflective polarizer 26R. Depending on the degree of modulation by the reflective liquid crystal display device 27R, a portion of the light passes through the reflective polarizer 26R to return toward the light source, and the other portion is reflected by the reflective polarizer 26R to enter the light integrating prism 28.

The laser beam of the green light component emitted from the laser emitting element 21G sequentially passes through the rod integrator 22G and the condenser lens 23G, is reflected by the reflecting mirror 24, and sequentially transmits the field lens 25G, the light diffusing plate 30G, and the reflective polarizer 26G. The light that has passed through the reflective polarizer 26G enters the reflective liquid crystal display device 27G, by which the light is modulated in accordance with the video signal. The green light component modulated by the reflective liquid crystal display device 27G reenters the reflective polarizer 26G. Depending on the degree of modulation by the reflective liquid crystal display device 27G, a portion of the light passes through the reflective polarizer 26G to return toward the light source, and the other portion is reflected by the reflective polarizer 26G to enter the light integrating prism 28.

The laser beam of the blue light component emitted from the laser emitting element 21B sequentially passes through the rod integrator 22B, the condenser lens 23B, the field lens 25B, the light diffusing plate 30B, and the reflective polarizer 26B. The light that has passed through the reflective polarizer 26B enters the reflective liquid crystal display device 27B, by which the light is modulated in accordance with the video signal. The blue light component modulated by the reflective liquid crystal display device 27B reenters the reflective polarizer 26B. Depending on the degree of modulation by the reflective liquid crystal display device 27B, a portion of the light passes through the reflective polarizer 26B to return toward the light source, and the other portion is reflected by the reflective polarizer 26B to enter the light integrating prism 28.

The light integrating prism 28 transmits the green light component and reflects the red and blue light components at 90 degrees. Accordingly, the light components of the three colors that have entered the light integrating prism 28 are integrated together to be emitted in the same direction. The light integrated as such enters the projection lens 29, by which a video (image) based on the light that has entered therein from the light integrating prism 28 is enlarged at a predetermined magnification and projected on a screen.

In the projection display apparatus 200 configured to operate as described above, the red light component traveling toward the light integrating prism 28 is diffused when passing through the light diffusing plate 30R provided on a side near the light source with respect to the reflective liquid crystal display device 27R. Likewise, the green light component traveling toward the light integrating prism 28 is diffused when passing through the light diffusing plate 30G provided on a side near the light source with respect to the reflective liquid crystal display device 27G, and the blue light component traveling toward the light integrating prism 28 is diffused when passing through the light diffusing plate 30B provided on a side near the light source with respect to the reflective liquid crystal display device 27B. Consequently, the same as in the first embodiment, the shade to be projected on the screen because of the light scattering at the prism bonding part becomes less visible. Particularly when a coherent light source that emits coherent light such as a laser beam is used, the shade may become more distinct on the screen because of the intense directivity of the light source. In such a case, image quality can be markedly improved by using the light diffusing elements.

Third Embodiment

Figure 4:
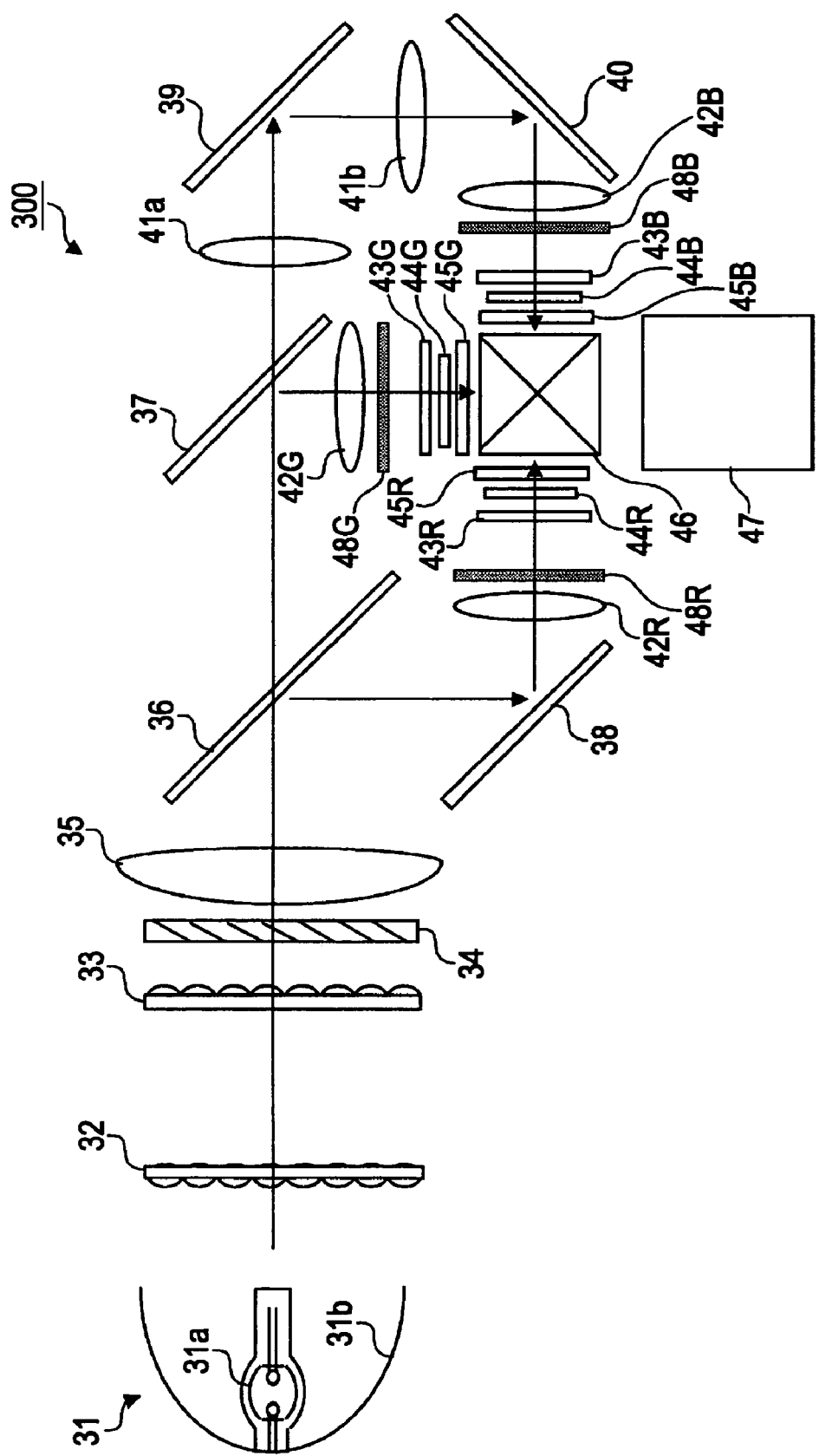
FIG. 4 is a schematic diagram of a projection display apparatus according to a third embodiment of the present invention.
Figure 5:
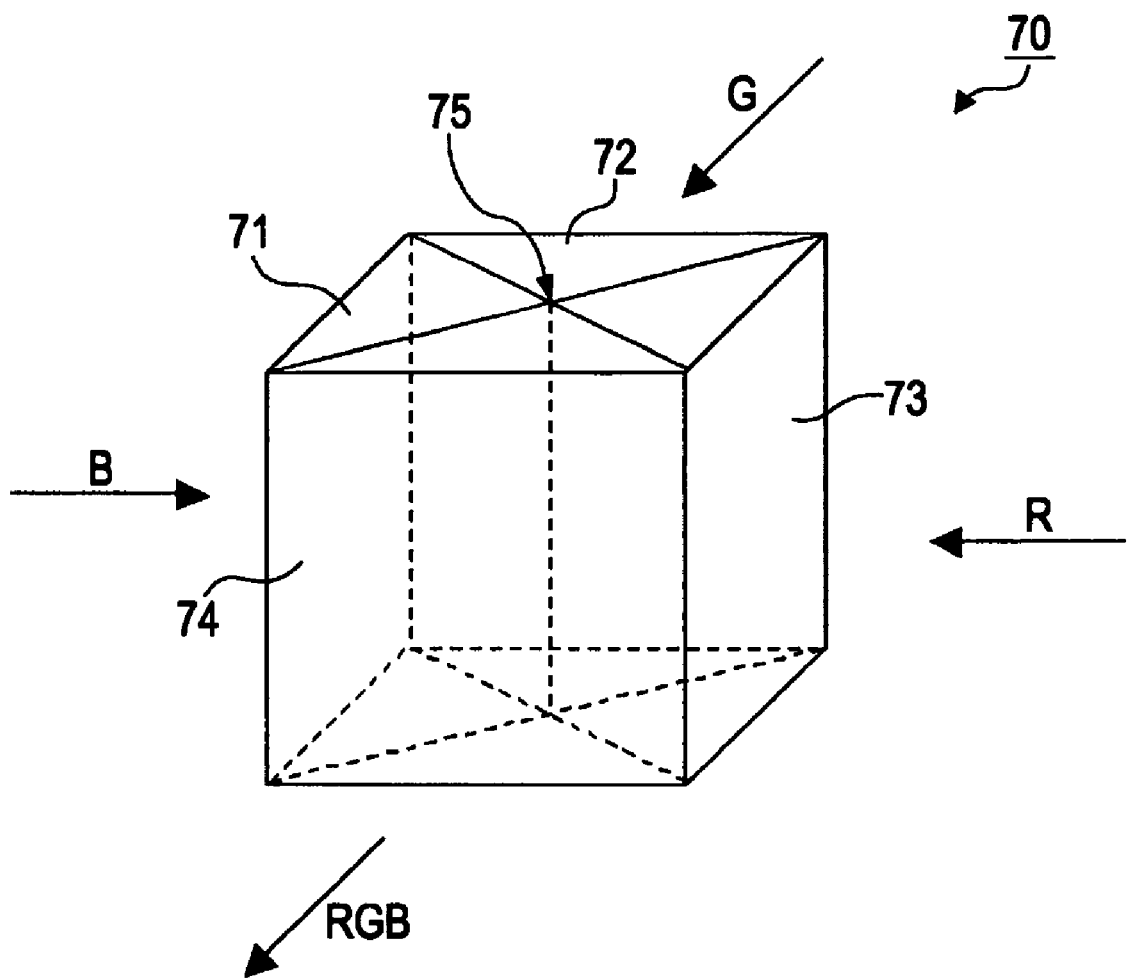
FIG. 5 shows a light-integrating cross-dichroic prism.
Figure 6:
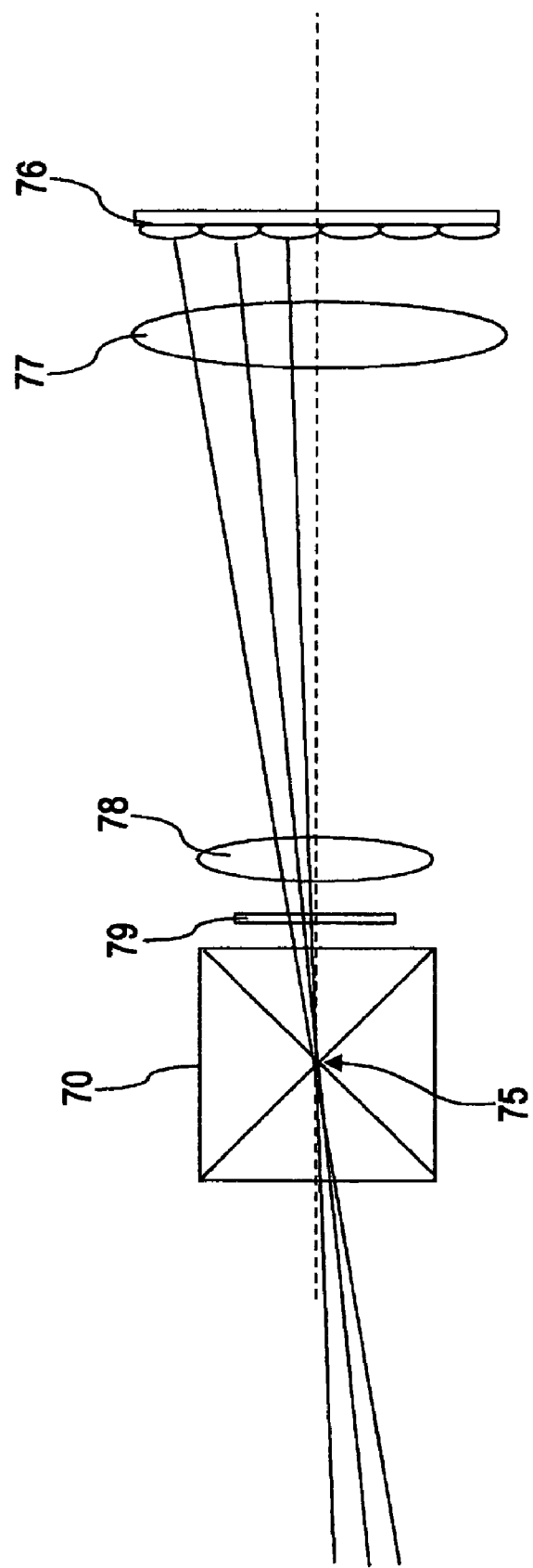
FIG. 6 is a schematic diagram showing a path of light incident on the cross-dichroic prism.

FIG. 4 is a schematic diagram of an exemplary projection display apparatus according to a third embodiment of the invention. A projection display apparatus 300 includes a lamp 31 as a light source, two integrator lenses (fly-eye lenses) 32 and 33, a polarization beam splitter 34, a condenser lens 35 as a light condensing element, two dichroic mirrors 36 and 37 as light separating elements, three reflecting mirrors 38, 39, and 40, two relay lenses 41a and 41b, three field lenses 42R, 42G, and 42B, three incident polarizers 43R, 43G, and 43B as first polarizing elements, three transmissive liquid crystal display devices 44R, 44G, and 44B as light modulating elements, three output polarizers 45R, 45G, and 45B as second polarizing elements, a light integrating prism 46 as a light integrating element, a projection lens 47 as a projection optical element, and three light diffusing plates 48R, 48G, and 48B as light diffusing elements.

The lamp 31, which emits white light, is an ultra-high-pressure mercury lamp, for example, and includes a light emitting unit 31a and a reflector 31b. The light emitting unit 31a of the lamp 31 is disposed at the focal position of the reflector 31b. The light emitted from the light emitting unit 31a of the lamp 31 is reflected by the reflector 31b, thereby being emitted as almost parallel light.

The integrator lenses 32 and 33 are provided for equalizing the illuminances of the light to be incident on the transmissive liquid crystal display devices 44R, 44G, and 44B. The polarization beam splitter 34 polarizes the light incident thereon through the integrator lenses 32 and 33 in a predetermined direction. The condenser lens 35 condenses the light incident thereon through the polarization beam splitter 34.

The dichroic mirror 36 reflects at 90 degrees the red light component of the light incident thereon through the condenser lens 35, and transmits the green and blue light components. The dichroic mirror 37 transmits the blue light component of the light that has passed through the dichroic mirror 36, but reflects at 90 degrees the green light component of the same light.

The reflecting mirror 38 reflects at 90 degrees the red light component reflected by the dichroic mirror 36. The reflecting mirror 39 reflects at 90 degrees the blue light component that has passed through the dichroic mirror 37. The reflecting mirror 40 reflects at 90 degrees the blue light component reflected by the reflecting mirror 39.

The relay lens 41a is disposed at a halfway point on an optical path running from the dichroic mirror 37 to the reflective mirror 39. The relay lens 41a transmits the blue light component incident thereon through the dichroic mirror 37. The relay lens 41b is disposed at a halfway point on an optical path running from the reflective mirror 39 to the reflective mirror 40. The relay lens 41b transmits the blue light component reflected by the reflective mirror 39.

The field lens 42R transmits the red light component reflected by the reflecting mirror 38. The field lens 42G transmits the green light component reflected by the dichroic mirror 37. The field lens 42B transmits the blue light component reflected by the reflective mirror 40.

The incident polarizer 43R polarizes the red light component that has passed through the field lens 42R to be incident on the transmissive liquid crystal display device 44R. The output polarizer 45R polarizes the light that has passed through the transmissive liquid crystal display device 44R. The incident polarizer 43G polarizes the green light component that has passed through the field lens 42G to be incident on the transmissive liquid crystal display device 44G. The output polarizer 45G polarizes the light that has passed through the transmissive liquid crystal display device 44G. The incident polarizer 43B polarizes the blue light component that has passed through the field lens 42B to be incident on the transmissive liquid crystal display device 44B. The output polarizer 45B polarizes the light that has passed through the transmissive liquid crystal display device 44B.

The transmissive liquid crystal display device 44R modulates the red light component incident thereon through the incident polarizer 43R. The transmissive liquid crystal display device 44G modulates the green light component incident thereon through the incident polarizer 43G. The transmissive liquid crystal display device 44B modulates the blue light component incident thereon through the incident polarizer 43B.

The light integrating prism 46 integrates the light components of the three colors (R, G, and B) respectively incident thereon from the output polarizers 45R, 45G, and 45B. The light integrating prism 46 is a cross-dichroic prism. The projection lens 47 enlarges and projects the light (an image) integrated by the light integrating prism 46 on a screen (not shown).

The light diffusing plate 48R diffuses and transmits the red light component incident thereon from the lamp 31 through the field lens 42R. The light diffusing plate 48R is disposed on one of optical paths running from the lamp 31, which is the most upstream end, to the projection lens 47, which is the most downstream end. With respect to the transmissive liquid crystal display device 44R, the light diffusing plate 48R resides on a side near the light source and between the incident polarizer 43R and the field lens 42R, which is the lens residing nearest to the transmissive liquid crystal display device 44R. More specifically, the light diffusing plate 48R faces the light outputting surface of the field lens 42R.

The light diffusing plate 48G diffuses and transmits the green light component incident thereon from the lamp 31 through the field lens 42G. The light diffusing plate 48G is disposed on another one of the optical paths. With respect to the transmissive liquid crystal display device 44G, the light diffusing plate 48G resides on a side near the light source and between the incident polarizer 43G and the field lens 42G, which is the lens residing nearest to the transmissive liquid crystal display device 44G. More specifically, the light diffusing plate 48G faces the light outputting surface of the field lens 42G.

The light diffusing plate 48B diffuses and transmits the blue light component incident thereon from the lamp 31 through the field lens 42B. The light diffusing plate 48B is disposed on the other one of the optical paths. With respect to the transmissive liquid crystal display device 44B, the light diffusing plate 48B resides on a side near the light source and between the incident polarizer 43B and the field lens 42B, which is the lens residing nearest to the transmissive liquid crystal display device 44B. More specifically, the light diffusing plate 48B faces the light outputting surface of the field lens 42B.

In the projection display apparatus 300 having the configuration described above, white light emitted from the lamp 31 sequentially passes through the integrator lenses 32 and 33, the polarization beam splitter 34, and the condenser lens 35, and enters the dichroic mirror 36. At the dichroic mirror 36, the red light component is reflected, and the green and blue light components are transmitted therethrough.

The red light component reflected by the dichroic mirror 36 is reflected by the reflecting mirror 38, and sequentially passes through the field lens 42R, the light diffusing plate 48R, and the incident polarizer 43R. The light that has passed through the incident polarizer 43R enters the transmissive liquid crystal display device 44R, by which the light is modulated in accordance with a video signal. The red light component modulated by the transmissive liquid crystal display device 44R passes through the output polarizer 45R, and enters the light integrating prism 46.

The light that has passed through the dichroic mirror 36 enters the dichroic mirror 37, at which the blue light component is transmitted therethrough and the green light component is reflected. The green light component reflected by the dichroic mirror 37 sequentially passes through the field lens 42G, the light diffusing plate 48G, and the incident polarizer 43G. The light that has passed through the incident polarizer 43G enters the transmissive liquid crystal display device 44G, by which the light is modulated in accordance with the video signal. The green light component modulated by the transmissive liquid crystal display device 44G passes through the output polarizer 45G, and enters the light integrating prism 46.

The blue light component that has passed through the dichroic mirror 37 passes through the relay lens 41a, is reflected by the reflecting mirror 39, passes through the relay lens 41b, and is reflected by the reflective mirror 40. The blue light component reflected by the reflective mirror 40 sequentially passes through the field lens 42B, the light diffusing plate 48B, and the incident polarizer 43B. The light that has passed through the incident polarizer 43B enters the transmissive liquid crystal display device 44B, by which the light is modulated in accordance with the video signal. The blue light component modulated by the transmissive liquid crystal display device 44B passes through the output polarizer 45B, and enters the light integrating prism 46.

The light integrating prism 46 transmits the green light component and reflects the red and blue light components at 90 degrees. Accordingly, the light components of the three colors that have entered the light integrating prism 46 are integrated together to be emitted in the same direction. The light integrated as such enters the projection lens 47, by which a video (image) based on the light incident thereon from the light integrating prism 46 is enlarged at a predetermined magnification and projected on a screen.

In the projection display apparatus 300 configured to operate as described above, the red light component traveling toward the light integrating prism 46 is diffused when passing through the light diffusing plate 48R provided on a side near the light source with respect to the transmissive liquid crystal display device 44R. Likewise, the green light component traveling toward the light integrating prism 46 is diffused when passing through the light diffusing plate 48G provided on a side near the light source with respect to the transmissive liquid crystal display device 44G, and the blue light component traveling toward the light integrating prism 46 is diffused when passing through the light diffusing plate 48B provided on a side near the light source with respect to the transmissive liquid crystal display device 44B. In this manner, as in the first and second embodiments, the shade to be projected on the screen because of the light scattering at the prism bonding part becomes less visible.

In the first to third embodiments, light diffusing elements (light diffusing plates) are provided separately from the field lenses so as to face the output surfaces of the respective field lenses. However, the invention is not limited thereto. For example, to reduce the cost for providing an antireflection (AR) coating or the like, the light diffusing element and the field lens may be formed integrally. The two can be integrated together by, for example, providing a light diffusing element on a film or a glass substrate and bonding the film or the glass substrate to the field lens with thermosetting resin or ultraviolet hardening resin provided therebetween.

When liquid crystal display devices are used as light modulating elements, the light of each color component enters the corresponding polarizer after passing through the corresponding light diffusing element. Therefore, it is important that the light diffusing element is nonbirefringent so that birefringence of light does not occur when the light passes through the light diffusing element.

However, the light modulating elements are not necessarily liquid crystal display devices, and may be modulating elements of other types, such as DMDs.

In the first to third embodiments, the light diffusing elements are disposed so as to face the output surfaces of the respective field lenses. However, the light diffusing elements may be disposed so as to face the incident surfaces of the respective field lenses.

Each light diffusing element is preferably disposed between the downstream integrator lens (fly-eye lens) and the light modulating element. To further increase the efficiency for light utilization, the light diffusing element is preferably disposed near the lens (field lens) nearest to the light modulating element. In the case of an optical system including rod integrators instead of the fly-eye lenses, each light diffusing element is preferably disposed between the light modulating element and the lens residing at an immediately downstream position from the rod integrator. To further increase the efficiency for light utilization, the light diffusing element is preferably disposed near the lens (field lens) nearest to the light modulating element. Another preferable position of the light diffusing element is between the light source and the upstream fly-eye lens (or a position facing the incident end of the rod integrator). If a laser emitting element is used as the light source, the light diffusing element is preferably disposed at a position where a beam diameter is smallest. In this manner, a higher efficiency for light utilization can be obtained.

It should be understood by those skilled in the art that various modifications, combinations, sub-combinations and alterations may occur depending on design requirements and other factors insofar as they are within the scope of the appended claims or the equivalents thereof.

What is claimed is:
1. A projection display apparatus comprising:
a light source;
a fly-eye lens arranged to receive light emitted from the light source;
a plurality of light modulating elements that respectively modulate different color components of the light emitted from the light source;

a plurality of light diffusing elements arranged such that each light diffusing element is disposed between the fly-eye lens and the respective light modulating element;

a plurality of reflective polarizers each arranged between a respective one of the light modulating elements and a respective one of the light diffusing elements associated therewith;

a light integrating element that integrates the different color components modulated by the light modulating elements; and a projection optical element that projects light resulting from the different color components integrated by the light integrating element, each reflective polarizer configured to enable the light emitted from the light source which has passed through the respective light diffusing element to pass therethrough so as to enter the respective light modulating element at which the entered light is modulated, and depending upon a degree of modulation to enable the modulated light from the respective light modulating element to reenter the respective reflective polarizer at which a portion thereof passes therethrough so as to return to the light source and another portion thereof is reflected so as to enter the light integrating element, each diffusing element is formed integrally with a field lens by providing the light diffusing element on a film or a glass substrate and bonding the film or the glass substrate to the field lens with thermosetting resin or ultraviolet hardening resin, and the field lens is the lens residing nearest to the light modulating element corresponding to the diffusing element.

2. The projection display apparatus according to claim 1, wherein each of the light diffusing elements has a diffusing angle of at least 3 degrees and at most 8 degrees.

3. The projection display apparatus according to claim 1, wherein the light diffusing elements are nonbirefringent.

* * * * *